Figure 1:
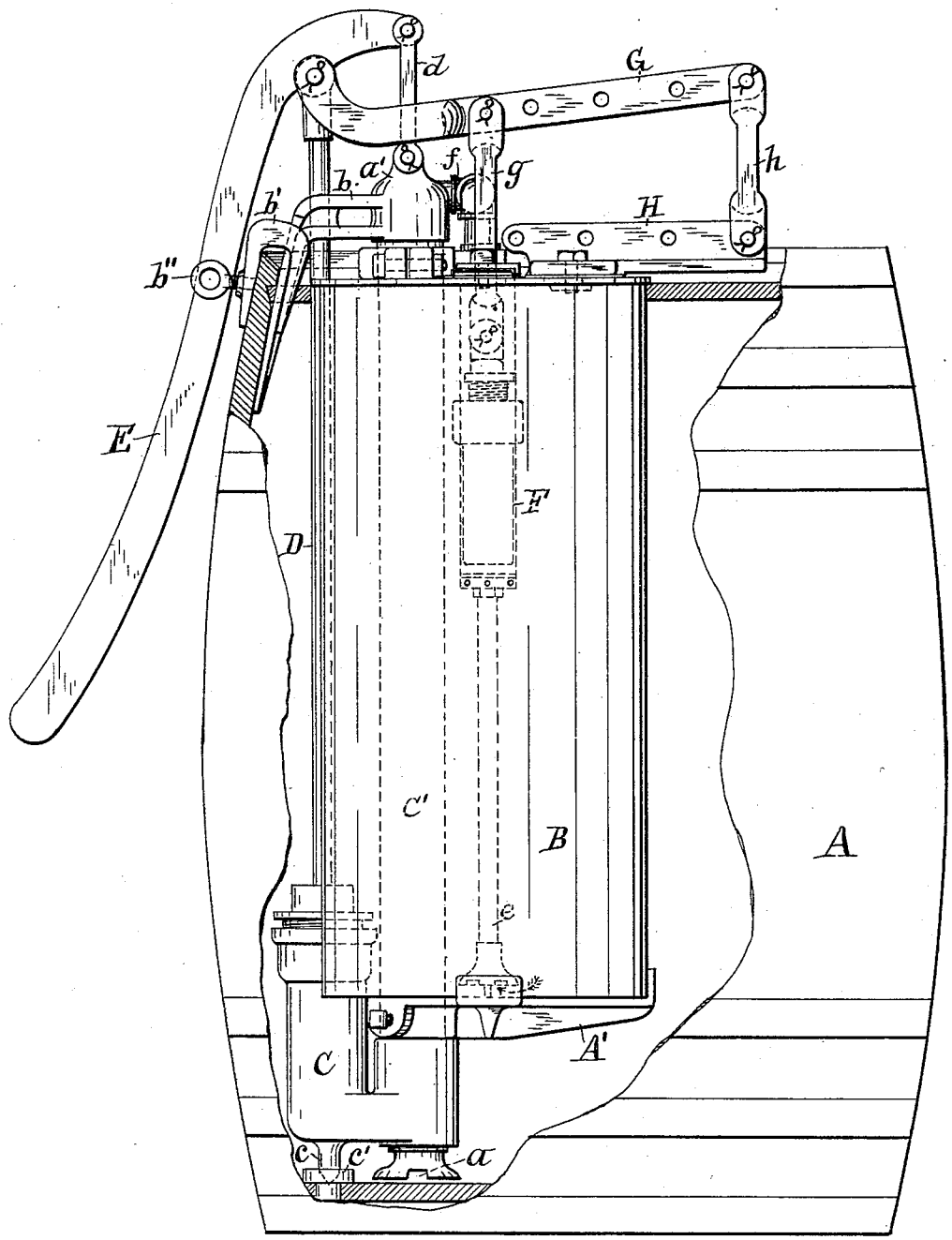

No. 620,701. Patented Mar. 7, 1899.
G. H. CUSHING.
SPRAYING APPARATUS.
(Application filed Sept. 15, 1898.)

(No Model.) 2 Sheets—Sheet 1.

Witnesses.
A. D. Allen
H. M. Seamans

Inventor.
George H. Cushing.
By Mark W. Dewey
his Attorney.

No. 620,701. Patented Mar. 7, 1899.
G. H. CUSHING.
SPRAYING APPARATUS.
(Application filed Sept. 15, 1898.)
(No Model.) 2 Sheets—Sheet 2.
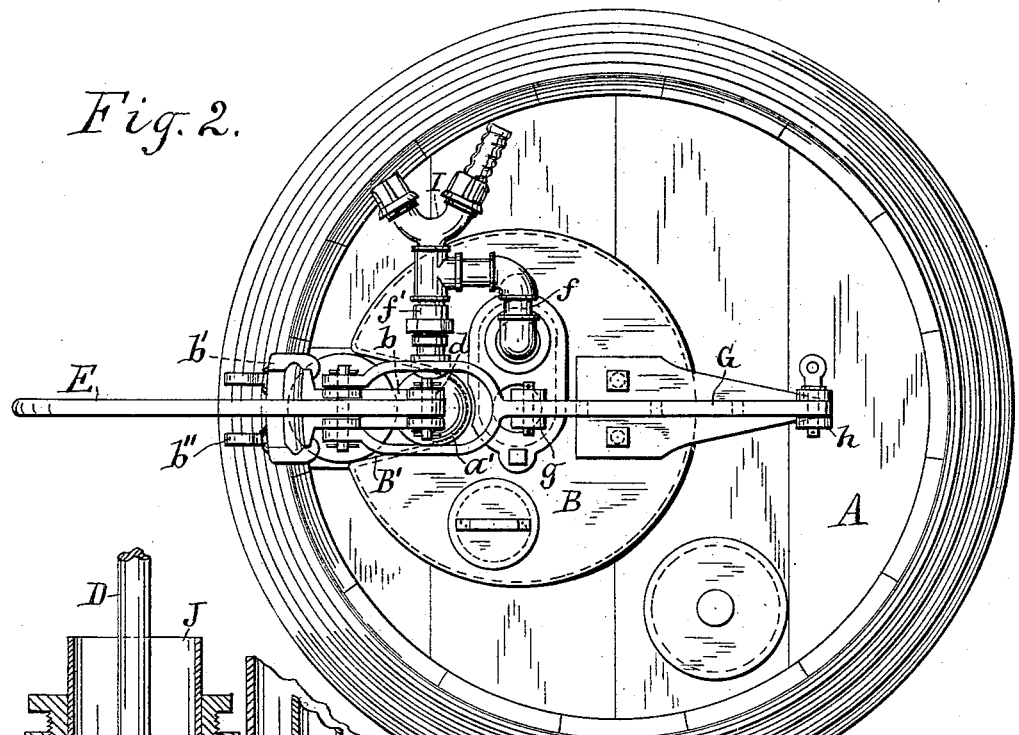
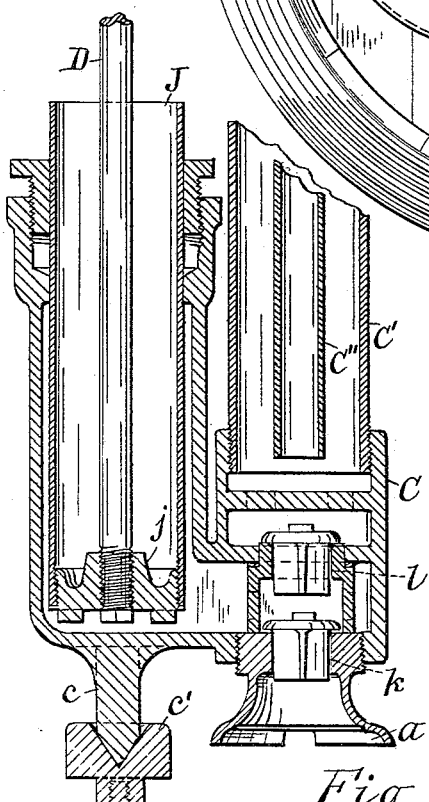
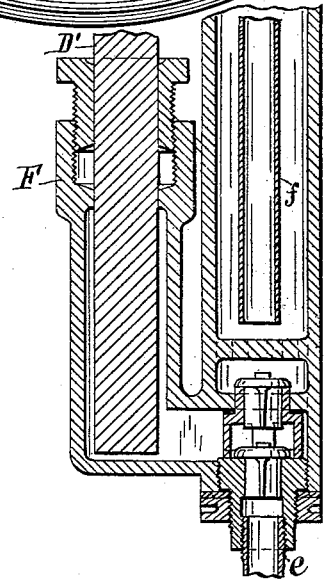
Witnesses.
A. D. Allen
H. M. Seamans
Inventor.
George H. Cushing.
By Mark W. Dewey
his Attorney.

UNITED STATES PATENT OFFICE.

GEORGE H. CUSHING, OF SENECA FALLS, NEW YORK, ASSIGNOR TO THE GOULDS MANUFACTURING COMPANY, OF SAME PLACE.

SPRAYING APPARATUS.

SPECIFICATION forming part of Letters Patent No. 620,701, dated March 7, 1899.

Application filed September 15, 1898. Serial No. 690,991. (No model.)

*To all whom it may concern:*

Be it known that I, GEORGE H. CUSHING, of Seneca Falls, in the county of Seneca, in the State of New York, have invented new and useful Improvements in Spraying Apparatus, of which the following, taken in connection with the accompanying drawings, is a full, clear, and exact description.

My invention relates to spraying apparatus for spraying plants and trees with different mixtures—as, for instance, water and kerosene, or water, ammonia, and copper sulfate—to prevent the growth of fungi and to remove insects; and the object of my invention is to provide such spraying apparatus with means for thoroughly and properly mixing the different substances or compounds automatically and without the necessity of first preparing the mixture in a vessel before it is applied. When, as usual, the mixture is prepared before it is subjected to the action of the spraying apparatus, it is necessary to agitate it continually by some means in order that the substances may not settle or separate or be applied unevenly by the spraying apparatus to the plants. These agitators are sometimes operated by the pump and are formed of a paddle or a small nozzle to discharge a jet of water in the vessel containing the solution, and while they accomplish their purpose to some extent they fail to thoroughly and accurately mix the substances, especially at the beginning of the operation, after the substances have settled or partially separated. When improperly or not thoroughly mixed, the preparations are often more injurious than beneficial, and plants and trees have been destroyed by their application.

In some kerosene-sprayers the kerosene is contained in a separate tank connected with the pump-cylinder by means of a suction-pipe. Another suction-pipe connects the same pump with the water-reservoir, so that both kerosene and water are forced by the pump through the spraying-nozzle. In this case the mixing of the liquids takes place partially in the pump, and the proportion of oil is controlled by means of a valve. This arrangement while thought by some to be superior to those depending upon agitators is nevertheless inefficient and cannot be relied upon to thoroughly mix the liquids in proper proportions, it having been found in practice that at times there was a greater quantity of kerosene applied than at others, the cut-off in the outlet of the kerosene-tank remaining in the same position.

I have overcome all of the above objections and have succeeded in thoroughly and accurately mixing the different liquids automatically in any desirable proportions by my improved spraying apparatus.

My invention consists in the combination, with separate tanks containing different liquids, of a pump for each tank, a single operating means connected with both pumps, means to vary the relative movement of the pump-pistons, and a single discharge-opening for both pumps; and my invention consists in certain other combinations of parts, hereinafter described, and specifically set forth in the claims.

In the drawings hereto annexed and forming a part of my invention, Figure 1 is a side elevation of my improved pumping apparatus, the outer reservoir being partially broken away. Fig. 2 is a top plan view of the apparatus, and Figs. 3 and 4 are enlarged central vertical sectional views of the two pumps.

Although I have shown and will describe the pumps preferably used in this apparatus, it will be obvious that any suitable and well-known forms of pumps may be used and that these pumps may be alike or differ in style or size, or both, in the same apparatus, and, furthermore, should more than two tanks containing different liquids be used each tank may be provided with a separate pump, and all of these pumps may discharge through the same outlet.

Referring specifically to the drawings, A is a barrel which forms the outer or larger tank to contain one of the liquids, and B is the smaller or inner tank, which in kerosene-spraying apparatus contains the kerosene. The tank B is placed to one side of the center of the tank A and rests upon a bracket A', supported near the bottom of tank A upon the pump C, which forces the water. The tank B is cylindrical, but is formed with a vertical longitudinal groove or recess B' in its side nearest the inner side of the barrel to allow space for the vertical air-chamber C', the discharge-pipe C'' within it, and also the piston-rod D of the pump C. The pump C is provided with a downward projection $c$ on its lower end, which rests in a socket $c'$, secured on the bottom or lower end of the barrel. This arrangement holds the pump securely in place and raises the inlet $a$ of the pump, which is also on its lower end, to one side of the projection and directly below the said air-chamber above the lower end or bottom of the barrel. The said inlet is bell-shaped and is preferably provided with recesses in its edges, as shown. The upper end of the air-chamber is covered by a cap $a'$, and this cap is provided with an integral angular projection $b$, which extends into the barrel and lies against its inner side. A double U-shaped clamp $b'$ engages the edges of this projection $b$, its legs lying on opposite sides of the staves, and set-screws $b''$, passing through the outer legs and bearing upon the staves, hold the upper end of the pumping apparatus in place.

Pivoted to a projection on the upper side of the cap $a'$ is a link $d$, which connects the cap with the inner end of the operating-handle E and forms the fulcrum therefor. The upper end of the piston-rod D is pivoted to the handle intermediate its length.

The pump F within the tank B is smaller than the other pump and is located near the upper part of the tank, the inlet or suction pipe $e$ thereof extending downward vertically and resting upon or near the bottom of the tank. The pumps are placed at right angles to each other to bring the outlets in proximity to each other. The outlet $f$ of the smaller pump passes through the upper end of the small tank and communicates with the outlet-pipe $f'$ of the larger pump, which passes through the side of the cap $a'$. The outlet-pipe $f'$ may be provided with a single coupling, but is shown provided with a double or Y-shaped pipe-coupling I for connection with two lines of hose which lead to the spraying-nozzles. (Not shown in the drawings.)

Any suitable and well-known form of spraying-nozzle may be employed.

The smaller pump is connected to and operated by the same handle E, by means of a link $g$, connecting the upper end of its piston-rod D' with a lever G, the link being connected to the lever intermediate its length, one end of the lever being bifurcated and curved upwardly and pivoted to the handle at the point where the piston-rod D is pivoted, the same pin passing through all the parts, and the other end of the lever G being connected by a link $h$ with a horizontal bar H below the lever and extending in the same direction or substantially parallel with the lever and secured to the upper end of the tank B. The upper end of the tank B is provided with a flange which rests upon the head of the barrel.

Both the lever G and the bar H are provided with a series of holes distributed along their length to receive the pins passing through the ends of the link $h$. By shifting this link from the position it occupies in the drawings toward the link $g$ the relative action of the pumps are changed, or, in other words, the length of the stroke of the piston of the small pump is decreased, causing a less quantity of kerosene or other liquid contained in the small tank to be mixed with the water forced out by the larger pump.

It will be obvious that other means than that shown and described may be employed to vary the discharge of the liquid from the pumps, and I do not desire to be limited to the precise means shown.

The pump shown in Fig. 3 of the drawings has a cylindrical piston J, which is closed at its lower end by a cap $j$. The piston-rod D is secured at its lower end to this cap. When the piston is raised, the liquid is drawn through the inlet $a$ and valve-opening $k$ into the chamber formed below the piston, the raising of the piston and the pressure in the air-chamber holding the valve-opening $l$ above the valve-opening $k$ closed. When the piston descends, the valve-opening $k$ is closed by the pressure of the water in the chamber and the valve-opening $l$ is opened, allowing the water to pass upward into the air-chamber C' and outlet-pipe C'' within the latter. The pump F is of substantially the same construction, except that the piston D' is shown formed of a solid bar, and therefore need not be more fully described herein.

It will be apparent that with this apparatus or an apparatus wherein two pumps are used, one for each liquid, the liquids will be mixed in the exact proportions desired positively and without any liability to variation and that this mixture may be evenly applied by a suitable spraying-nozzle, as before mentioned.

Having described my invention, what I claim as new, and desire to secure by Letters Patent, is—

1. In an apparatus for spraying plants, trees, &c., a pair of tanks to contain the liquids, a pump for each tank, outlets for the pumps communicating with each other to form a single outlet, and means to operate the pistons of both pumps simultaneously and in the same direction, as set forth.

2. In an apparatus for spraying plants, trees, &c., a pair of tanks to contain the liquids, a pump for each tank, outlets for the pumps communicating with each other, a single operating means for both pumps, and suitable means to vary the relative action of the pumps, as set forth.

3. In an apparatus for spraying plants, trees, &c., a pair of tanks secured one within the other, the inner tank having a vertical groove in its side, a pump for each tank, one of the pumps lying partially within the said groove, pipes connecting the discharge-openings of the pumps with a single outlet adapted to be connected to the spraying-nozzle, and a handle to operate both pumps simultaneously as set forth.

4. In an apparatus of the class described, the combination with a pair of tanks, of a pump for each tank, a handle for operating the pumps secured by a link extending from one of the ends of the handle to a cap on the upper end of one of the pumps, the piston-rod of the same pump connected to the handle, a lever having a bifurcated curved end also connected to the handle, a link between the lever and a stationary support on the upper part of the tank, and a link between the said lever and the piston-rod of the second pump, substantially as and for the purpose described.

5. In an apparatus of the class described, the combination with a pair of tanks secured one within the other, the inner tank having a vertical groove in one side, a pump in each tank, one pump having a bearing on the bottom of the larger tank and extending upward and lying partially within the said groove in the smaller tank, a bracket mounted on this pump supporting the smaller tank, operating means common to both pumps, means to vary the relative movements of the pistons of the pumps, and the discharge-openings of the pumps communicating with a single outlet, substantially as described and shown.

6. In an apparatus of the class described, the combination with a pair of tanks secured one within the other, the inner tank having a vertical groove in one side, a pump in each tank, one pump having a bearing on the bottom of the larger tank and extending upward and lying partially within the said groove in the smaller tank, a bracket mounted on this pump supporting the smaller tank, a handle for operating both pumps, a piston-rod pivoted to the handle intermediate its length, a link connecting one end of the handle with a cap secured to the upper end of the air-chamber of the larger pump, a lever having a bifurcated curved end pivoted to the handle at the point where the said piston-rod is pivoted, a horizontal bar secured to the upper end of the inner tank below the said lever, an adjustable link between the said horizontal bar and the said lever, and a link connecting the curved lever with the piston-rod of the smaller pump, substantially as and for the purpose described.

In testimony whereof I have hereunto signed my name.

GEORGE H. CUSHING. [L. S.]

Witnesses:
S. S. GOULD,
J. J. SWABY.